United States Patent
Matsuo et al.

(10) Patent No.: US 7,155,212 B2
(45) Date of Patent: *Dec. 26, 2006

(54) APPROVAL TEST METHOD AND AN APPROVAL TEST SYSTEM FOR A SOFTWARE-DEFINED RADIO TERMINAL, A SOFTWARE-DEFINED RADIO TERMINAL BEING CERTIFIED BY THE APPROVAL TEST METHOD, AND AN APPROVAL TEST APPARATUS FOR CERTIFYING THE SOFTWARE-DEFINED RADIO TERMINAL

(75) Inventors: Ryoko Matsuo, Tokyo (JP); Takashi Wakutsu, Kanagawa-ken (JP); Takeshi Tomizawa, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,250

(22) Filed: Aug. 15, 2005

(65) Prior Publication Data

US 2005/0272419 A1   Dec. 8, 2005

Related U.S. Application Data

(63) Continuation of application No. 10/653,130, filed on Sep. 3, 2003, now Pat. No. 6,954,636.

(30) Foreign Application Priority Data

Sep. 6, 2002 (JP) .............................. 2002-261831

(51) Int. Cl.
   *H04B 1/60* (2006.01)
(52) U.S. Cl. ................ 455/418; 455/432.2; 455/67.11; 455/9
(58) Field of Classification Search ................ 455/418, 455/435.2, 412.1–2, 419, 420, 423, 67.11, 455/115, 226.1, 9, 424, 425, 414.1, 432.1
   See application file for complete search history.

(56) References Cited

U.S. PATENT DOCUMENTS

| 6,223,030 B1 | 4/2001 | Van Den Heuvel et al. |
| 6,687,500 B1 | 2/2004 | Causey |
| 6,697,604 B1 | 2/2004 | Rimpela et al. |
| 6,795,703 B1 | 9/2004 | Takae et al. |
| 2002/0137514 A1 | 9/2002 | Mitsugi et al. |

(Continued)

FOREIGN PATENT DOCUMENTS

EP          0 977 451          2/2000

(Continued)

OTHER PUBLICATIONS

M. Cummings, et al., IEEE Communications Magazine, vol. 37, No. 8, pp. 104-106, XP-000835325, "Mode Switching and Software Download for Software Defined Radio: The SDR Forum Approach," Aug. 1999.

(Continued)

*Primary Examiner*—CongVan Tran
(74) *Attorney, Agent, or Firm*—Oblon, Spivak, McClelland, Maier & Neustadt, P.C.

(57) ABSTRACT

An approval test apparatus according to the present invention that perform an approval test for a software-defined radio terminal based on approval information for a representative terminal as a database. The radio terminal outputs a request signal of adding the wireless functions and identification information of the radio terminal. The approval test apparatus determines whether or not the approval is given to the radio terminal that has outputted the request signal and the identification signal.

12 Claims, 10 Drawing Sheets

U.S. PATENT DOCUMENTS

2002/0144134 A1  10/2002  Watanabe et al.
2003/0163551 A1   8/2003  Rlordan

FOREIGN PATENT DOCUMENTS

EP    1 235 447      8/2002
JP    2001-189700    7/2001
WO    WO 01/86985   11/2001

OTHER PUBLICATIONS

W.H.W. Tuttlebee, Annales Des Telecommunications—Annals of Telecommunications, vol. 57, No. 5/6, pp. 314-337, XP-001122777, "Advances In Software Defined Radio Progres en Radio Logicielle", May 2002.

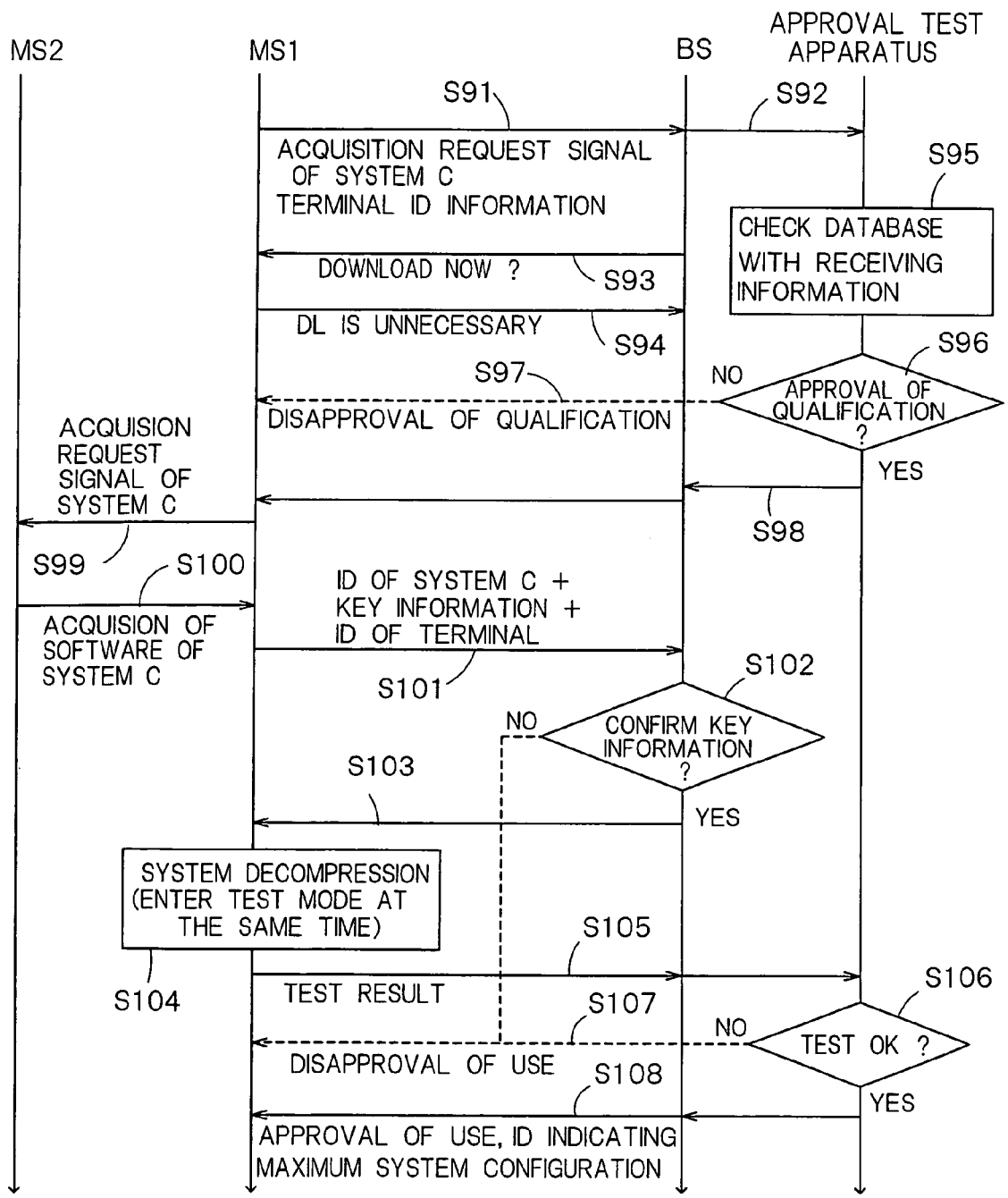
F I G. 9

APPROVAL TEST METHOD AND AN APPROVAL TEST SYSTEM FOR A SOFTWARE-DEFINED RADIO TERMINAL, A SOFTWARE-DEFINED RADIO TERMINAL BEING CERTIFIED BY THE APPROVAL TEST METHOD, AND AN APPROVAL TEST APPARATUS FOR CERTIFYING THE SOFTWARE-DEFINED RADIO TERMINAL

CROSS REFERENCE TO RELATED APPLICATIONS

This application is a continuation of, and claims priority to, U.S. Ser. No. 10/653,130, filed Sep. 3, 2003 now U.S. Pat. No. 6,954,636, and claims benefit of priority under 35 USC §119 to Japanese Patent Applications No. 2002-261831, filed on Sep. 6, 2002, the entire contents of which are incorporated by reference herein.

This application claims benefit of priority under 35 USC § 119 to Japanese Patent Applications No. 2002-261831, filed on Sep. 6, 2002, the entire contents of which are incorporated by reference herein.

BACKGROUND OF THE INVENTION

1. Field of the Invention

The present invention relates to a type approval test method and a type approval test system for a software defined radio terminal, a software defined radio being certified by means of the type approval test method, and an type approval test apparatus for certifying the software defined radio terminal.

2. Related Art

In order to use a wireless terminal such as a cellular phone, a PHS (Personal Handyphone System) and a wireless Local Area Network terminal regulated under IEEE802.11, a testing organization or a manufacturer has to perform a type approval test for certification of the wireless terminal in accordance with the Telecommunication Business Law. In such approval test, it is impossible to test all of the manufactured wireless terminals. Therefore, in such approval test, one terminal is used as a representative terminal on behalf of the same kind of terminals having same functions and similar structure, and this representative terminal is inspected. By testing only the representative terminal, the certification is given to each of the same kind of terminals that may have a same model number as the representative terminal.

Recently, a software-defied radio has been introduced. The software-defined radio allows a single device to adapt to different communications environments and communication systems by selecting the most appropriate protocol and frequency needed for a link. The software-defied radio works much like desktop computing, where a single hardware platform can carry out many functions based on the software applications loaded. The software-defied radio uses software to perform radio-signal processing functions instead of using resistors, capacitors, feedback loops, or application-specific integrated circuits.

In the near future, a wireless terminal which adopts the software-defined radio (hereinafter referred to as "software-defined radio terminal") using a programmable hardware and software corresponding to each of wireless communication systems, for example, GSM, W-CDMA (UMTS), wireless local area network regulated under IEEE 802.11, installed in the hardware will be developed by a plurality of vendors. Users may use combinations of these hardware and software.

In the conventional approval test method, every time when new software is downloaded, it will be necessary to take the terminal to the testing organization and perform the approval test for the certification. Because of this, advantageous effect of the software-defined radio in which it is possible to easily perform addition or deletion of the communication system is remarkably spoiled.

The approval test method for the software-defined radio terminal is disclosed in, for example, Japanese Patent Publication Laid-Open No. 252598/2002. This publication discloses a technique in which a result of the approval test for a representative terminal is transmitted to the other terminal having the same function.

However, even in the same kind of terminal, the version of the loaded software may be different for each terminal. The kinds of the loaded software may also be different for each terminal even if the kind of terminals is the same. Therefore, it may be improper to transmit the test result of the representative terminal to the other terminals having the same functions.

SUMMARY OF THE INVENTION

An object of the present invention is to provide a an approval test method and an approval test system for a software-defined radio terminal, a software-defined radio terminal being certified by the approval test method, and an approval test apparatus for certifying the software-defined radio terminal capable of simplifying processing procedure of the approval test of the software-defined radio terminal.

In order to achieve the foregoing object, an approval test method for a software-defined radio terminal, comprising:

receiving a request signal from said software-defined radio terminal requesting an addition of a wireless function;

receiving identification information of said software-defined radio terminal;

determining upon the reception of the request signal whether or not to give a type approval certificate to the software-defined radio terminal based on a content of a database including approval information of a representative terminal whose configuration of hardware is same as said software-defined radio terminal; and transmitting a result of the determination to said software-defined radio terminal.

Furthermore, an n approval test system comprising:

a software-defined radio terminal; and an type approval test apparatus which executes an approval test for said software-defined radio terminal requesting a addition of a wireless function, wherein said software-defined radio terminal comprising a signal output unit which outputs both a request signal of the addition of the wireless function and identification information of the software-defined radio terminal;

said test apparatus comprising:

a database which includes approval information for a representative terminal whose configuration of hardware is same as said software-defined radio terminal;

an approval determination unit which determines whether or not the approval is given to said software-defined radio terminal based on a content of the database; and a determination result transmitter which transmits the determination result of the approval determination to said software-defined radio terminal.

Furthermore, an approval test system having a software-defined radio terminal and an type approval test apparatus comprising:

means for receiving a request signal from said software-defined radio terminal requesting an addition of a wireless function at said test apparatus;

means for receiving identification information of said software-defined radio terminal at said test apparatus;

means for determining upon the reception of the request signal whether or not to give an type approval certificate to the software-defined radio terminal based on a content of a database including approval information of a representative terminal whose configuration of hardware is same as said software-defined radio terminal at said test apparatus; and means for transmitting a result of the determination to said software-defined radio terminal at said test apparatus.

Furthermore, a software-defined radio terminal capable of adding and deleting a wireless function, and requesting a type approval certificate to an approval test apparatus comprising:

a transceiver which transmits and receives a wireless signal;

a signal processor which modulates and demodulates the wireless signal; and a transmitting and receiving controller which controls transmitting and receiving of the wireless signal, having an ID storage which stores an inherent ID which identifies the software-defined radio terminal as it is, a system ID which indicates information relating to the wireless function included in the software-defined radio terminal, and a configuration ID which indicates kinds of currently available wireless function at said software defined radio terminal, and updating a content in said ID storage in case said approval test apparatus has approved the software-defined radio terminal at a state of adding the wireless functions.

Furthermore, an approval test apparatus, comprising:

a database which stores approval information for a representative terminal whose configuration of hardware is same a software-defined radio terminal requesting a type approval certificate to the test apparatus;

an approval determination unit which determines whether the approval is given to said software-defined radio terminal based on said database, said software-defined radio terminal outputting both a request signal for adding a wireless functions and identification information of said software-defined radio terminal, and outputs the determination result to said software-defined radio terminal; and an examination result determination unit which determines whether or not the added wireless function works at said software-defined radio terminal based on a examination result transmitted from said software-defined radio terminal examining whether or not a loaded software for added wireless function runs normally.

BRIEF DESCRIPTION OF THE DRAWINGS

FIG. 9 is a flowchart showing a fifth processing procedure of the approval test system.

DESCRIPTION OF THE PREFERRED EMBODIMENTS

Hereinafter, an approval test method and an approval test system for a software-defined radio terminal, a software-defined radio terminal being certified by the approval test method, and an approval test apparatus for certifying the software-defined radio terminal according to the present invention will be more specifically described with reference to drawings.

Figure 1A:
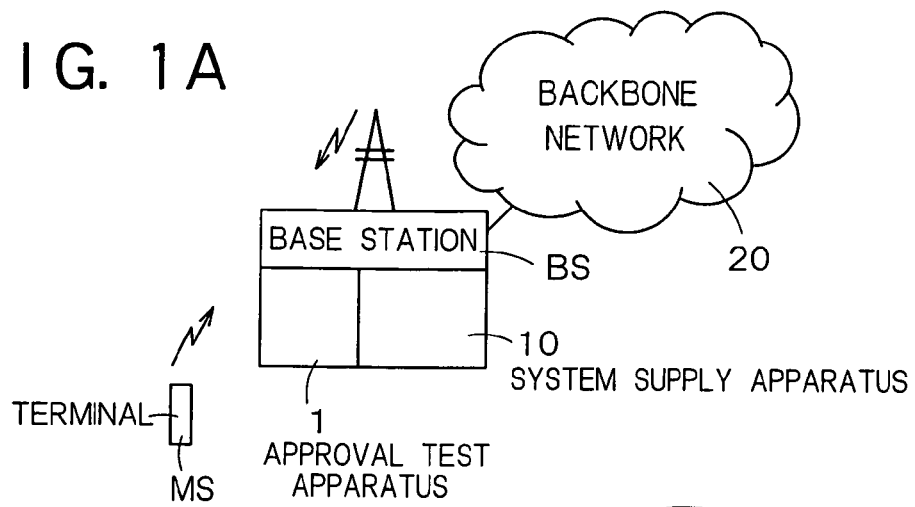
FIGS. 1A, 1B and 1C are diagrams indicating schematic configuration of an example of an approval test system according to the present invention.

FIG. 1A is a block diagram showing schematic configuration of an embodiment of an approval test system according to the present invention. The approval test of FIG. 1A has a wireless terminal MS, a base station BS, an approval test apparatus 1, and a system supply apparatus 10. The wireless terminal MS adopts the software-defined radio that can work with several communication systems by adding and deleting wireless functions. The base station BS performs wireless communication for the wireless terminal MS. The approval test apparatus 1 performs a type approval test of the wireless terminal MS for the certification. The system supply apparatus 10 supplies software to perform wireless functions executed by the wireless terminal MS.

Figure 1B:
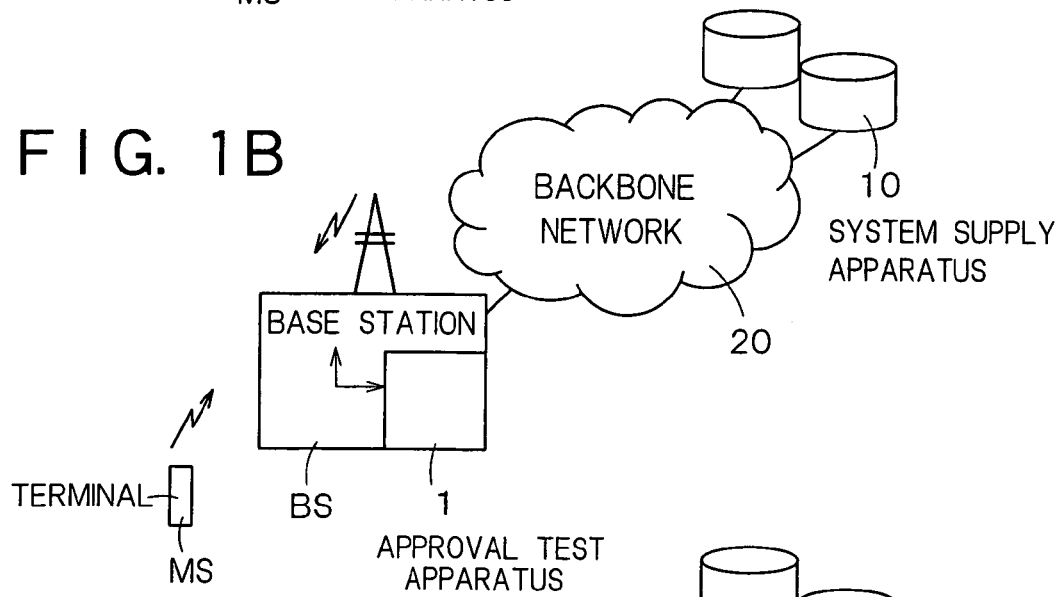
Figure 1C:
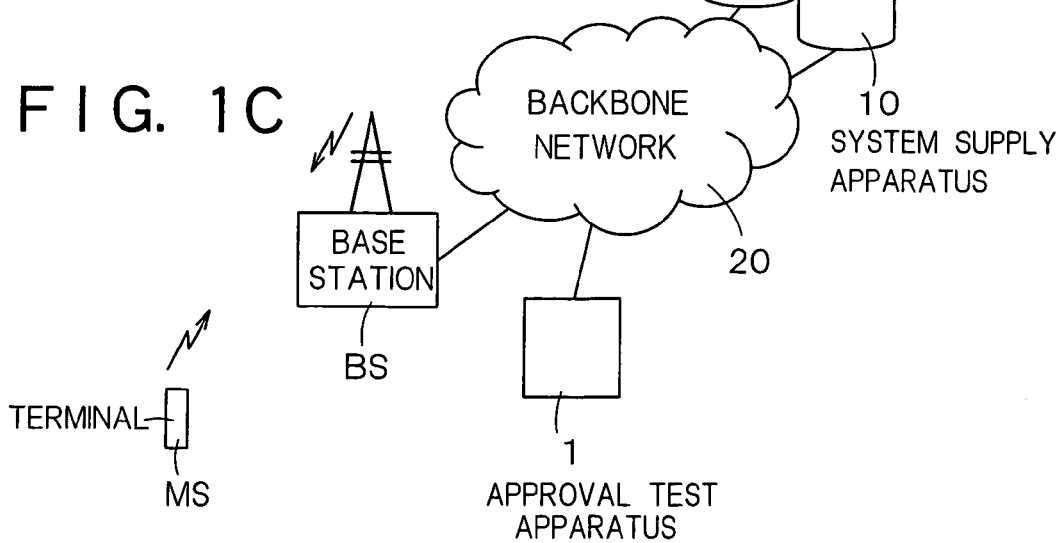

In FIG. 1A, an example in which the approval test apparatus 1 and the system supply apparatus 10 are provided as a unit including the base station BS has been described. As shown in FIG. 1B, the system supply apparatus 10 may be connected to the base station BS via a backbone network 20. Or as shown in FIG. 1C, the base station BS, the approval test apparatus 1 and the system supply apparatus 10 may be connected to the backbone network 20.

Figure 2:
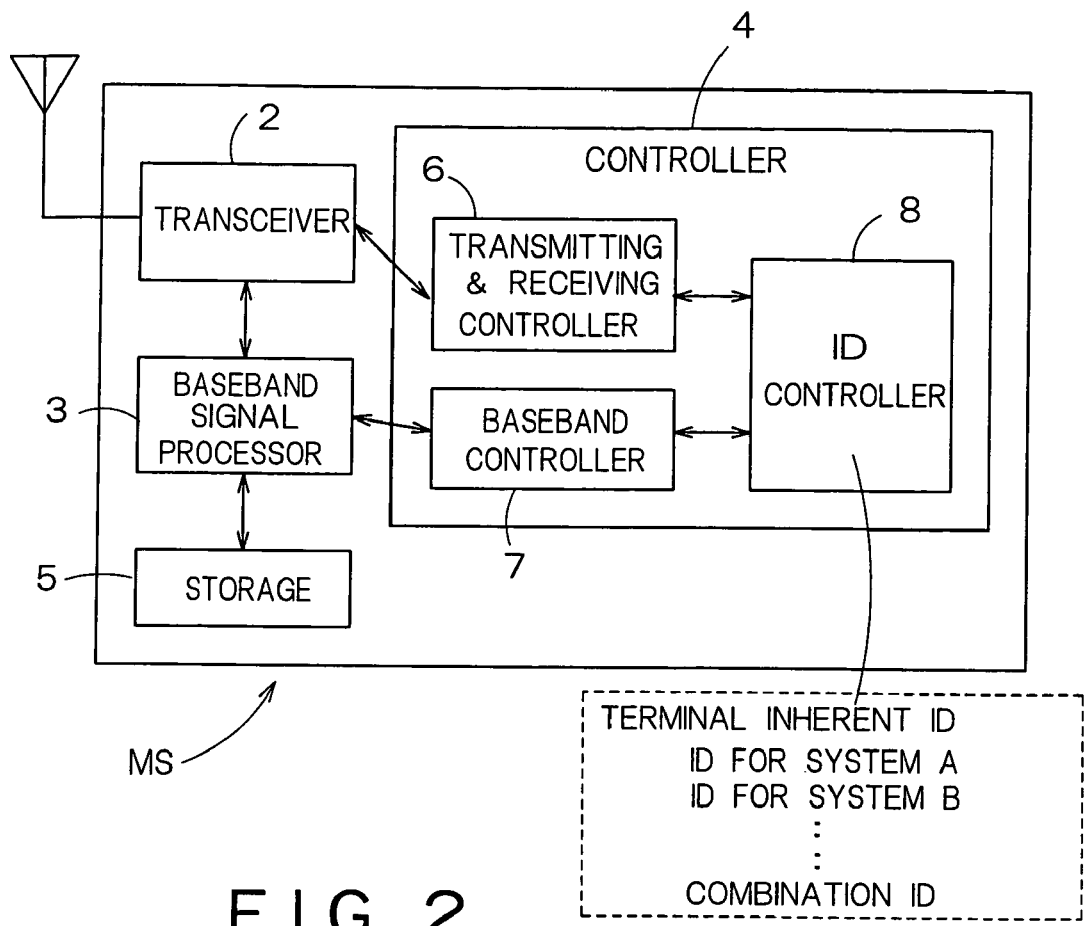
FIG. 2 is a block diagram showing one example of internal configuration of a wireless terminal MS.

FIG. 2 is a block diagram showing an example of internal configuration of the wireless terminal MS. As shown in FIG. 2, the wireless terminal MS has a transceiver 2 which performs transmitting & receiving of an analog wireless signal and D/A conversion from a digital signal to the analog wireless signal or A/D conversion from the analog wireless signal to the digital signal, a baseband signal processor 3 which performs signal processing of the digital signal, a controller 4 which performs control such as the transceiver 2 and the baseband signal processor 3, and a storage 5.

The controller 4 has a transmitting & receiving controller 6 which controls the transceiver 2, a baseband controller 7 which controls the baseband signal processor 3, and an ID controller 8 which manages various identification information of the wireless terminal MS. The identification information managed by the ID controller 8 includes terminal ID information to be transmitted by the wireless terminal MS. The terminal ID information includes an inherent ID which identifies the terminal, a system ID which identifies each wireless function held by the terminal, and a system configuration ID which identifies the kinds of currently available wireless functions held by the terminal. An inherent ID can be a "serial number". Each wireless terminal has each serial number.

The wireless function held by the wireless terminal MS includes not only cellular systems, for example, a PDC (Personal Digital Cellular system) or a W-CDMA (UMTS), but also wireless LAN systems. The same cellular system or wireless LAN system can be added as a function of an option. In case that such function needs the approval, the approval test is performed for such function.

When the wireless terminal MS adds or deletes the wireless functions, the identification information managed by the ID controller is automatically updated depending on the addition or deletion of the wireless functions. Update of the ID controller 8 may be performed by hand, instead of automatic update of the ID controller 8.

The ID controller 8 stores the information relating to wireless functions held by the wireless terminals MS. Because of this, the approval test apparatus 1 can grasp the system configuration of the wireless terminals MS by receiving the terminal ID information from the wireless terminals MS.

Figure 3:
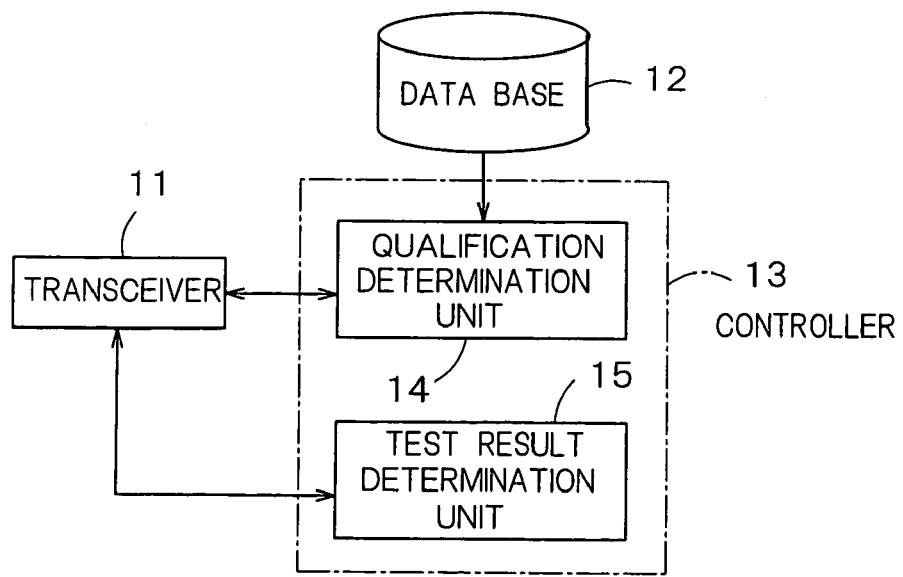
FIG. 3 is a block diagram showing one example of internal configuration of an approval test apparatus 1.

FIG. 3 is a block diagram showing one example of internal configurations of the approval test apparatus i. As shown in FIG. 3, the approval test apparatus 1 has a transceiver 11 which transmits and receives a wireless (or wired) signal for the base station BS, a database 12 which stores approval information of the representative terminal, and a controller 13 which controls all the approval test apparatus 1. The database is a list contains a result of the type approval test of the representative terminals. The representative terminal has already been approved on behalf of the wireless terminals whose configuration of hardware is same as the representative terminal. The representative terminal is selected among the wireless terminals whose model number is the same and whose hardware configuration is the same.

The controller 13 has an approval determination unit 14 and a test result determination unit 15. The approval determination unit 14 determines whether or not to approve the wireless terminal MS that has requested addition or deletion of the wireless functions by the request signal, based on the contents of the database 12. The unit 14 outputs a result of the determination. The test result determination unit 15 receives a result tested by the wireless terminal MS based on software downloaded by the wireless terminal MS that has been approved, and determines whether or not the system normally operates based on the received result.

Although FIG. 1 shows an example in which the wireless terminal MS communicates with the approval test apparatus 1 via the base station BS, the wireless terminal MS may communicates with the approval test apparatus 1 without passing through the base station BS, or the wireless MS may perform communicate with the approval test apparatus 1 via an apparatus except for the base station BS.

(First Procedure of the Approval Test)

It is assumed that the wireless terminal MS which possesses either systems A or B (for example, a GSM and a W-CDMA) desires to possess a system C. The procedure of the approval in this case is described in a flowchart as shown in as FIG. 4.

First of all, the wireless terminal MS which desires to adapt additional communication system (the system C) transmits the terminal ID information including an acquisition request signal of the system C, an inherent ID which identifies its own terminal, a system ID which identifies the wireless functions held by its own terminal, and a system configuration ID which indicates the kinds of currently available wireless functions held by its own terminal (step S1). The base station BS transmits the received terminal ID information to the approval test apparatus 1 (step S2).

Subsequently, the approval test apparatus 1 checks the terminal ID information with information in the database 12 (step S3). The approval test apparatus 1 determines whether or not the information corresponding to the received terminal ID information is stored in the database 12 (step S4). As mentioned above, the approval information for the representative terminal is stored in the database 12. The approval information for the representative terminal is the result of the approval test for the representative terminal. The approval test apparatus 1 realizes the model number from the terminal ID information transmitted from wireless terminal MS since the terminal ID information includes the inherent ID of the wireless terminal MS. It is easy to find the model number from the serial number (inherent ID) of the wireless terminal MS. The test apparatus 1 selects the representative terminal having the realized model number. The test apparatus 1 also realize the desired system (in this case, system C), present available system (in this case system A and B) from the system ID and configuration of the system (in this case combination of system A and B) from the system configuration ID. The test apparatus check the database and search for the result of the approval test for the selected representative terminal with system A, B and C. If the database shows that the approval test for the representative terminal possessing system A, B and C, the wireless terminal MS can be approved.

If the information corresponding to the received terminal ID is not stored in the database 12, the signal, which indicates the wireless terminal MS is not approved is transmitted via the base station BS (step S5). If the information is stored in the database 12, the signal, which indicates the wireless terminal MS is approved is transmitted to the base station BS (step S6).

Upon the reception of such signal, the base station BS transmits software for adapting to the system C (including the system ID of the system C) to the wireless terminal MS (step S7). In the step S7, the software may be forcedly transmitted from the base station BS to the wireless terminal MS. Or the wireless terminal MS may access the base station BS in order to request download of the software for the system C.

The wireless terminal MS decompresses the loaded software if necessary when the software for the system C is acquired, and proceeds to a test mode (step S8). The test includes whether or not the software for the system C can be normally acquired and whether or not electric properties such as a frequency of the system C and transmission power are normal. The test may also include that whether or not the downloaded software runs normally at the terminal MS.

After the test is finished, the wireless terminal MS transmits the test result to the approval test apparatus 1 via the base station BS (step S9). The approval test apparatus 1 analyzes the test result (step S10), and transmits a signal indicating that the system C is not allowed to use in the wireless terminal MS if it is determined that the wireless terminal MS does not normally operate (step S11). On the other hand, if it is determined that the wireless terminal normally operates in system C, both a signal indicating that the system C is allowed to use and the system configuration ID indicating the system configuration of the wireless terminal MS are transmitted to the wireless terminal MS via the base station BS (step S12). After then, the wireless terminal MS can transmit and receive the wireless signal for the base station BS by using the system C (step S13).

Figure 5:
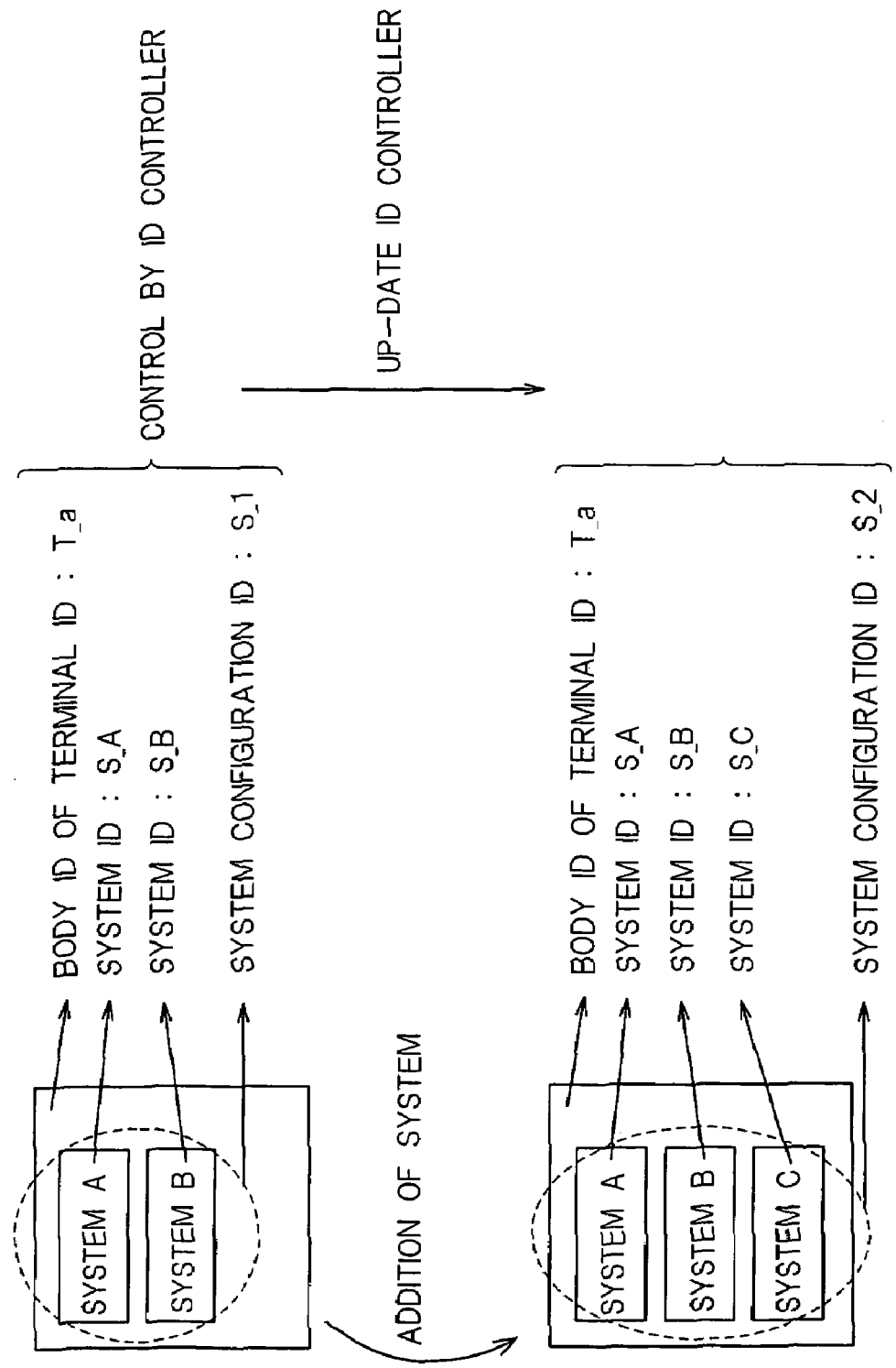
FIG. 5 is a diagram describing update of the ID controller in the wireless terminal MS in the case of performing processings of FIG. 4 and adding the system C.

FIG. 5 is a diagram showing update of the ID controller 8 in the wireless terminal MS in the case of adding the system C. Before adding the system C, the ID controller 8 has held system IDs (S_A, S_B) for systems A and B and system configuration ID (S_1). By adding the system C, the system ID (S_C) for the system C is added, and the system configuration ID is updated to S_2.

Figure 4:
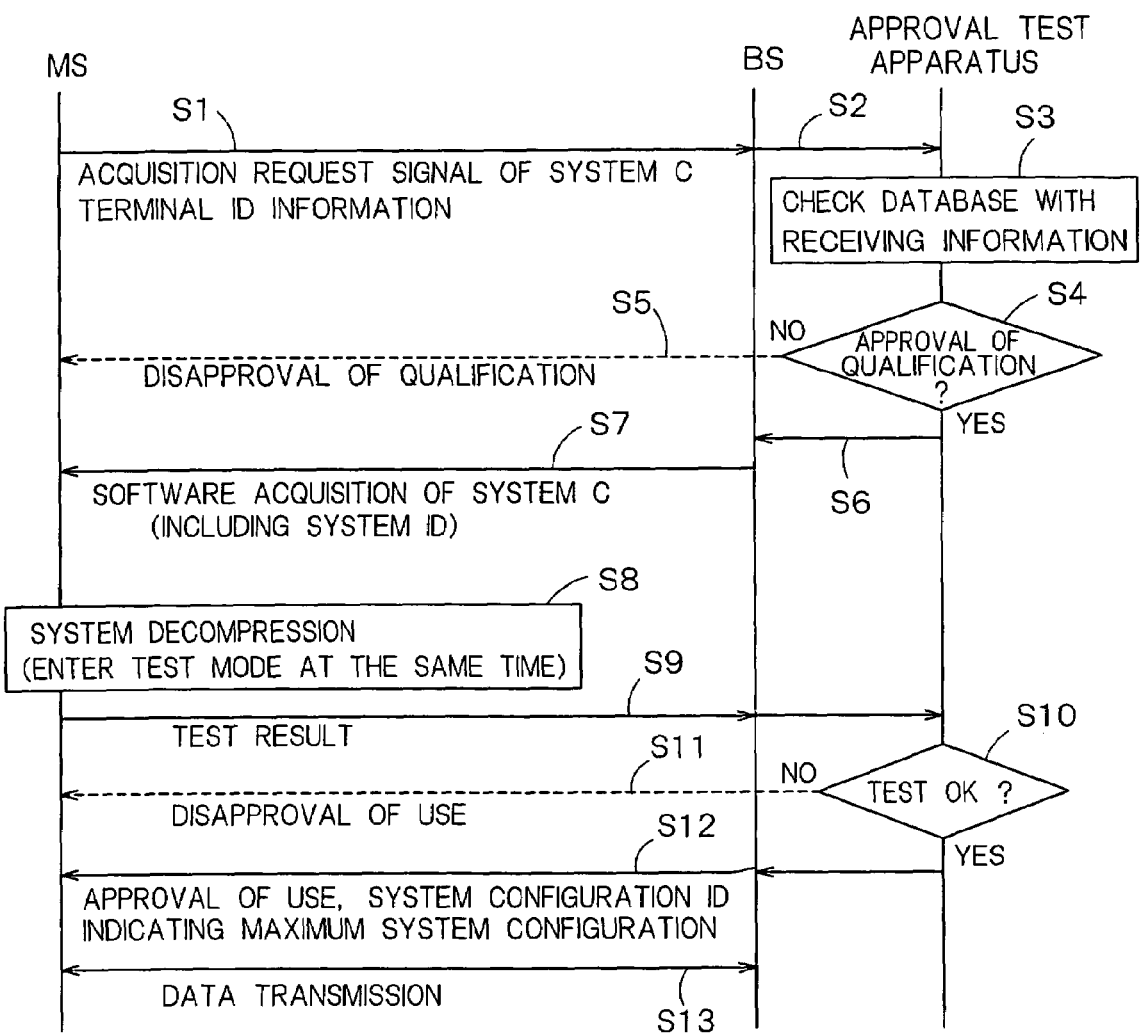
FIG. 4 is a flowchart showing a first processing procedure of the approval test system.

As described above, according to the first processing procedure shown in FIG. 4, when the wireless terminal MS desires addition or elimination of wireless functions, the wireless terminal MS requests the approval test to the approval test apparatus 1 over the radio. If it is approved, desirable software is acquired over the radio. It is possible to simplify qualification procedure in the case of adding or deleting the wireless functions for the software-defined wireless terminal.

(Second Procedure of the Approval Test)

In a second procedure of the approval test system described as follows, after the approval test apparatus 1 approved the wireless terminal MS and then after a prescribed time period passed, the wireless terminal MS acquires the software for the system C.

Figure 6:
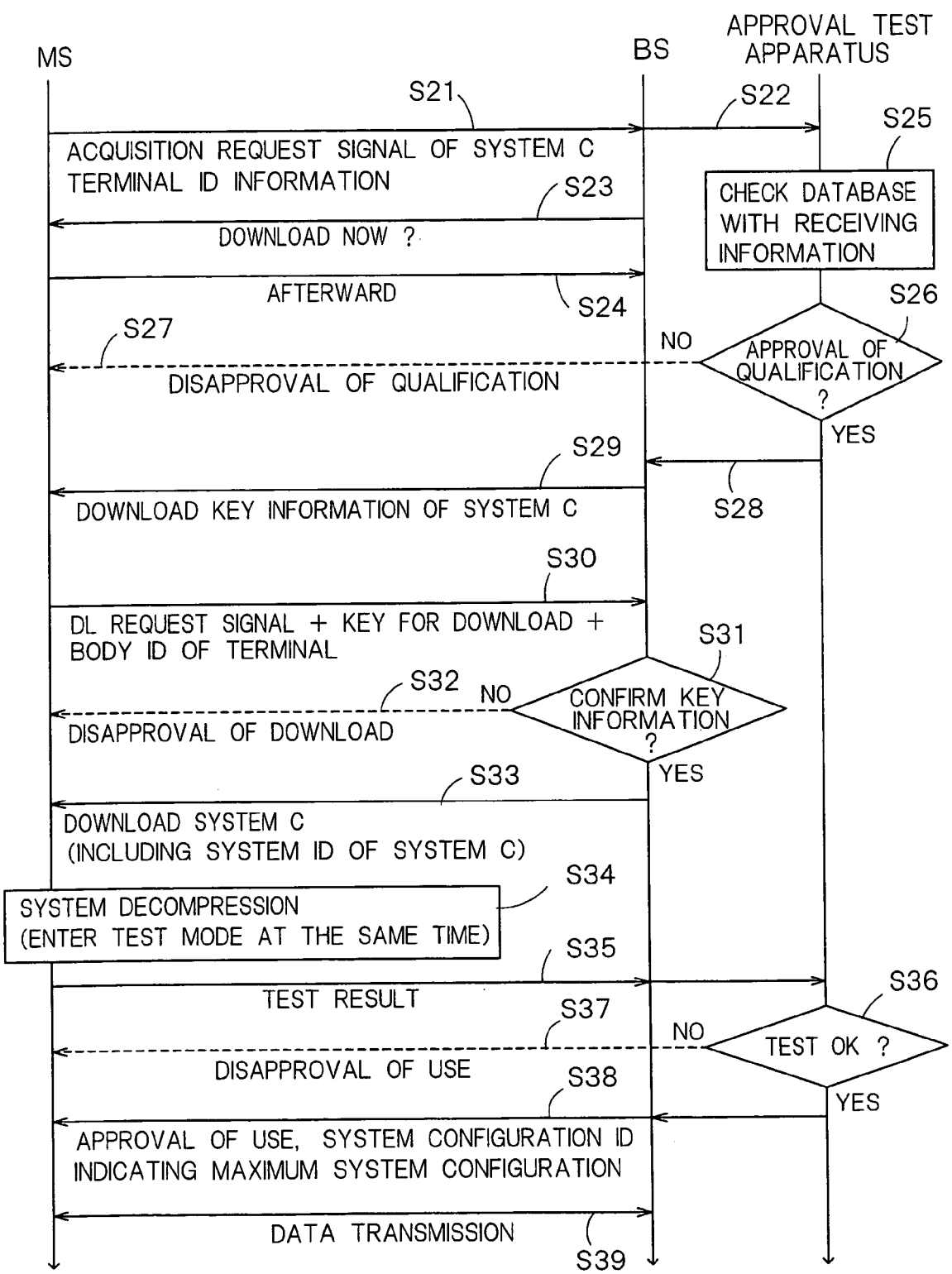
FIG. 6 is a flowchart showing a second processing procedure of the approval test system.

FIG. 6 is a flowchart showing a second processing procedure of the approval test system according to the present invention. Hereinafter, processings different from those of FIG. 4 will be mainly described. After the base station BS receives a terminal ID information from the wireless terminal MS, the base station BS inquires at the wireless terminal MS about whether or not it acquires the software for the system C at once (step S23). In reply to this inquiry, it is assumed that the wireless terminal MS replies to acquire the software afterward (step S24).

Such an inquiry is performed when propagation environment of radio wave is not good in periphery of the wireless terminal MS at present time, or when the wireless terminal MS is performing the other processings.

In this case, if the approval test apparatus 1 approves the wireless terminal MS, the base station BS transmits key information indicating approval of acquisition of the software to the wireless terminal MS, instead of transmitting the software for the system C to the wireless terminal MS (step S29).

After then, the wireless terminal MS transmits an acquisition request signal of the software, the key information for acquisition, and the inherent ID of the terminal MS to the base station BS (step S30).

The base station BS confirms whether or not there is impropriety in the key information transmitted from the wireless terminal MS (step S31). If there is not impropriety, the software for the system C is transmitted to the wireless terminal MS (step S33).

The wireless terminal MS performs decompression processing of the software if necessary when the software for the system C is acquired, and enters a test mode in order to perform a test of the system C.

Thus, according to the second processing procedure, when convenient for the wireless terminal MS, the wireless terminal MS can acquire the software. Because of this, even if propagation delay of radio wave is bad there is no likelihood for failing acquisition of the software.

(Third Procedure of the Approval Test)

In a third embodiment of an approval test system described as follows, the wireless terminal MS which cannot be approved as it is, is improved so as to be able to be approved.

Figure 7:
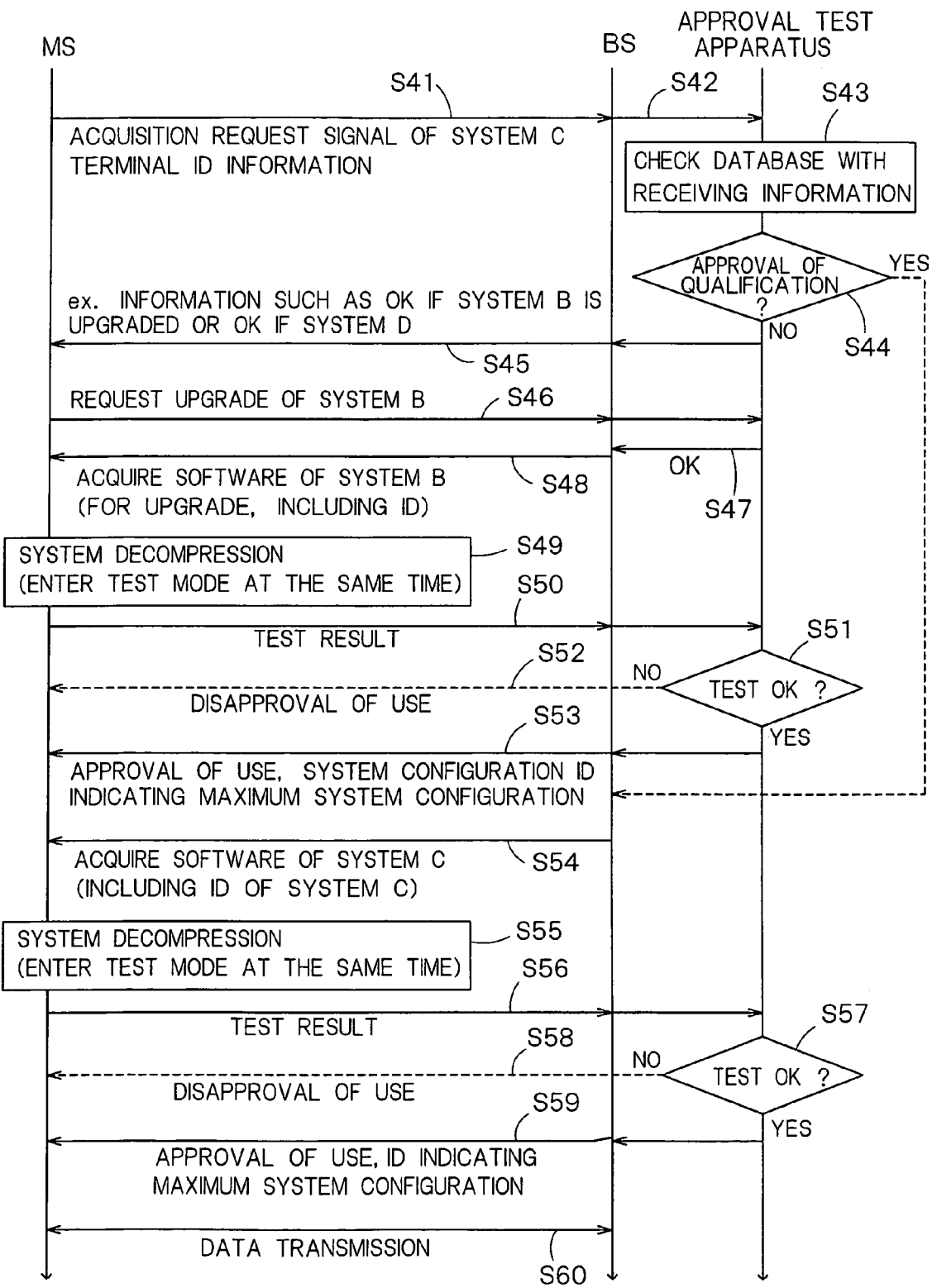
FIG. 7 is a flowchart showing a third processing procedure of the approval test system.

FIG. 7 is a flowchart showing a third processing procedure of the approval test system according to the present invention. Hereinafter, processings different from those of FIG. 4 will be mainly described. As a result of confirming terminal ID information of the wireless terminal MS, when determined to be able to approve the wireless terminal MS, the approval test apparatus 1 notifies the wireless terminal MS of condition for the approval (step S45). Here, the condition for the approval is, for example, to update the software to perform radio signal processing by system B or to possess the software for the system D.

In reply to this notification, the approval test apparatus 1 is notified that the wireless terminal MS desires update of the software for system B (step S46). In this case, the approval test apparatus 1 admits software transmission of the system B for the base station BS (step S47). In reply to this, the base station BS transmits the software to the wireless terminal MS (step S48).

The wireless base station BS decompresses the software if necessary, enters the test mode (step S49), and transmits the test result to the approval test apparatus 1 (step S50). The approval test apparatus 1 confirms the test result (step S51). If determined that the system B is not normally operated at the wireless terminal MS, use of the system B is disapproved (step S52). When determined that the system B is normally operated, use of the system B is approved, and a system configuration ID in the case of using the system B is transmitted to the wireless terminal MS (step S53). Subsequently, the wireless terminal MS acquires the software for the system C from the base station BS (step S54).

The wireless terminal MS which has acquired the software for the system C enters the test mode by decompressing the system (step S55). The test result is transmitted to the approval test apparatus 1 via the base station BS, and confirms whether or not the system C is normally operated at the wireless terminal MS (steps S56–S60).

Thus, according to the third processing procedure, even if the wireless terminal MS cannot be approved under the present circumstances, it is possible to approve the wireless terminal by improving the wireless terminal. Because of this, it becomes unnecessary to bring the wireless terminal MS to a service center and so on, thereby saving user's labor.

(Fourth Procedure of the Approval Test)

A fourth processing procedure of an approval test system described as follows is a modified example of the third processing procedure.

Figure 8:
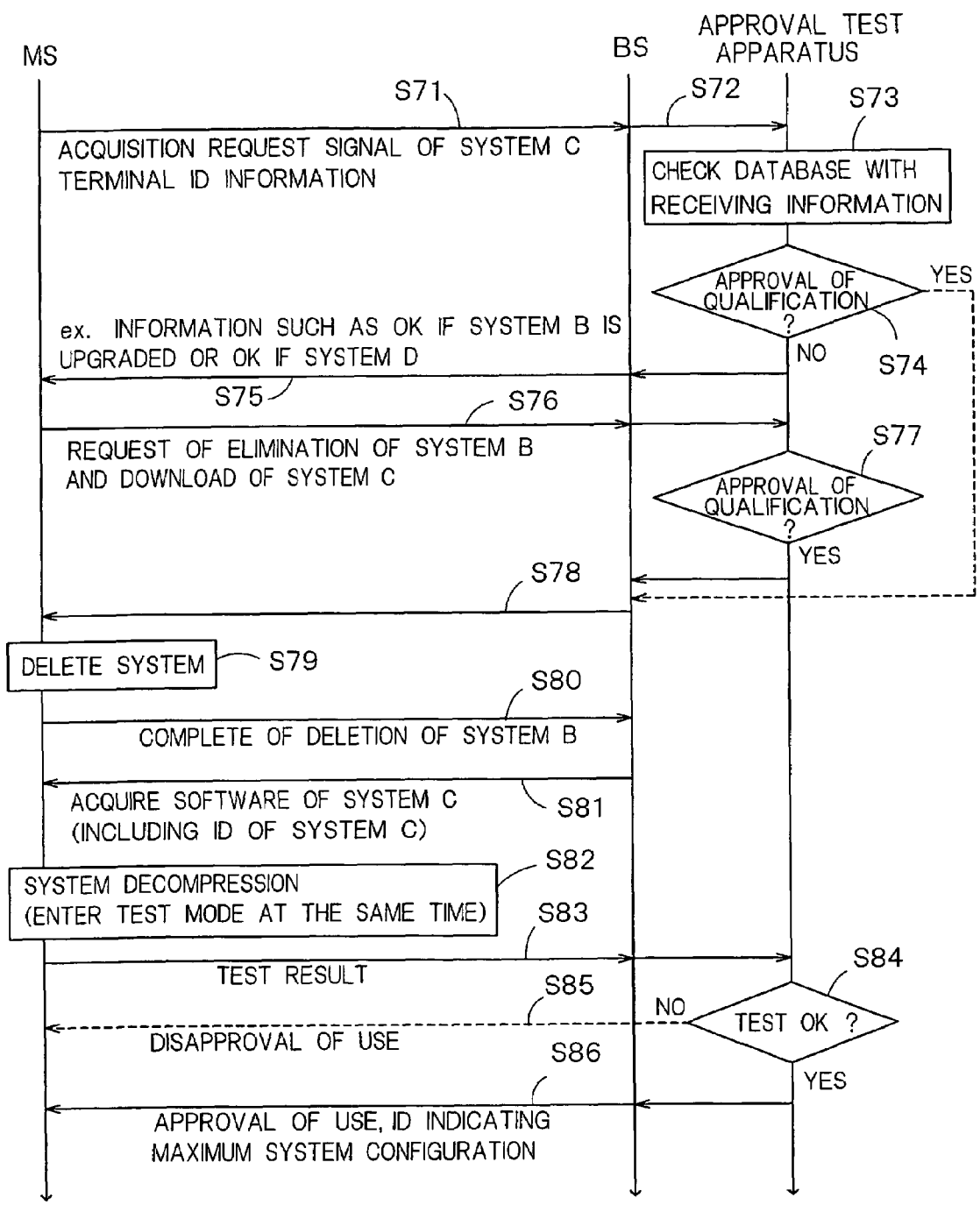
FIG. 8 is a flowchart showing a fourth processing procedure of the approval test system.

FIG. 8 is a flowchart showing a fourth processing procedure of the approval test system according to the present invention. Hereinafter, processings different from those of FIG. 7 will be mainly described In FIG. 7, if the software for the system B is upgraded, the wireless terminal MS has been approved. In step S75 of FIG. 8, if the system B is deleted, or the system D is possessed, the approval for the wireless terminal MS is notified from the approval test apparatus 1 to the wireless terminal MS.

In reply to this notification, the wireless terminal MS deletes the system B and the system ID (step S79), and notifies the deletion of the system B to the base station BS (step S80). In reply to this notification, the base station BS transmits the software for the system C to the wireless terminal MS (step S81).

The base station BS performs decompression processings of the software if necessary after receiving the software (step S82), and enters the test mode to test whether or not the system C is normally operated at the wireless terminal MS (step S83–S86).

Thus, according to the fourth processing procedure, even if the wireless terminal MS cannot be approved as it is, the procedures which are necessary for the approval is notified from the approval test apparatus 1 to the wireless terminal MS over the radio. Because of this, it is possible to acquire the approval certificate without taking the wireless terminal to the service center and so on.

(Fifth Procedure of the Approval Test)

A fifth processing procedure acquires the software for the system C from the other wireless terminal except for the base station BS.

FIG. 9 is a flowchart showing the fifth processing procedure of the approval test system according to the present invention. Hereinafter, processings different from those of FIG. 6 will be mainly described. The flowchart of FIG. 9 has another wireless terminal MS2 which provides the software, apart from the wireless terminal MS1 which requires acquisition of the software for the system C. That is, the wireless terminal MS1 acquires the software from the wireless terminal MS2, instead of the base station BS.

In step S96 of FIG. 9, when the approval test apparatus 1 approves acquisition of the software for the system C required by the wireless terminal MS1, the approval test apparatus 1 transmits the key information to the wireless terminal MS1 via the base station BS (step S98).

Subsequently, the wireless terminal MS1 transmits an acquisition request signal of the software to the wireless terminal MS2 (step S99). In reply to the signal, the wireless terminal MS2 provides the software to the wireless terminal MS1 (step S100).

The wireless terminal MS1 that has acquired the software for the system C transmits the system ID of the system C, the key information transmitted from the base station BS and its inherent ID (step S101).

The base station BS confirms whether or not the key information is not illegal (step S102). If not illegal, the base station BS decompresses the software of the system C acquired by the wireless terminal MS2 if necessary, enters the test mode (step S104), and performs the test of the system C (steps S105–S108).

Thus, according to the fifth processing procedure, a desirable software is acquired from the other wireless terminal MS2 different from the base station BS. For example, when the wireless terminal MS1 possess a system of a cellular phone and a wireless LAN system, if status of radio wave is not so much good, and status of radio wave of the wireless LAN system is good, it is possible to transmit only a control signal through the cellular phone, and to transmit the software through the wireless LAN system. Therefore, it is possible to stably acquire the software at high speed and to transmit the control signal even while acquiring the software.

(Sixth Processing Procedure)

A sixth processing procedure acquires the software from various recording medias such as a CD-ROM, a flexible disc and a PCMCIA card, instead of the other wireless terminal MS.

Figure 10:
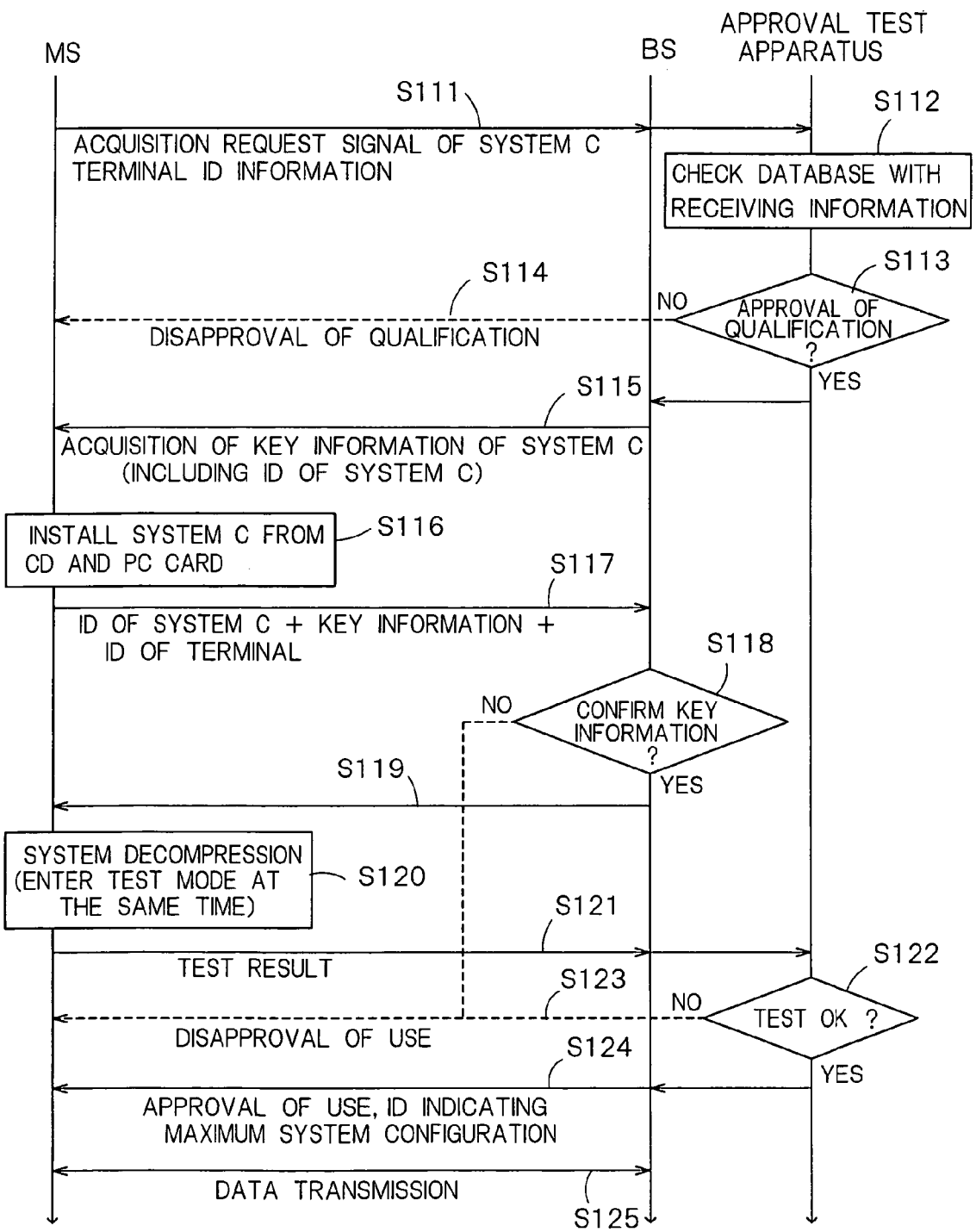
FIG. 10 is a flowchart showing a sixth processing procedure of the approval test system.

FIG. 10 is a flowchart showing the sixth processing procedure of an approval test system according to the present invention. Hereinafter, processings different from those of FIG. 9 will be mainly described. When the wireless terminal MS receives the key information for acquiring the software for the system C (step S115), the wireless terminal MS reads out the software from the recording media such as the CD-ROM and installs the software to its own terminal (step S116). The subsequent processings are the same as the fifth processing procedure.

Thus, according to the sixth processing procedure, because the wireless terminal MS reads out the software for the system C from various recording medias to install it, it is possible to stably add or eliminate the system at high speed.

(Seventh Processing Procedure)

An example in which although it has been impossible to approve the qualification of the wireless terminal MS at first, it becomes possible to give a type approval certificate by updating the database 12 of the approval test apparatus 1 afterward is shown in a seventh processing procedure.

Figure 11:
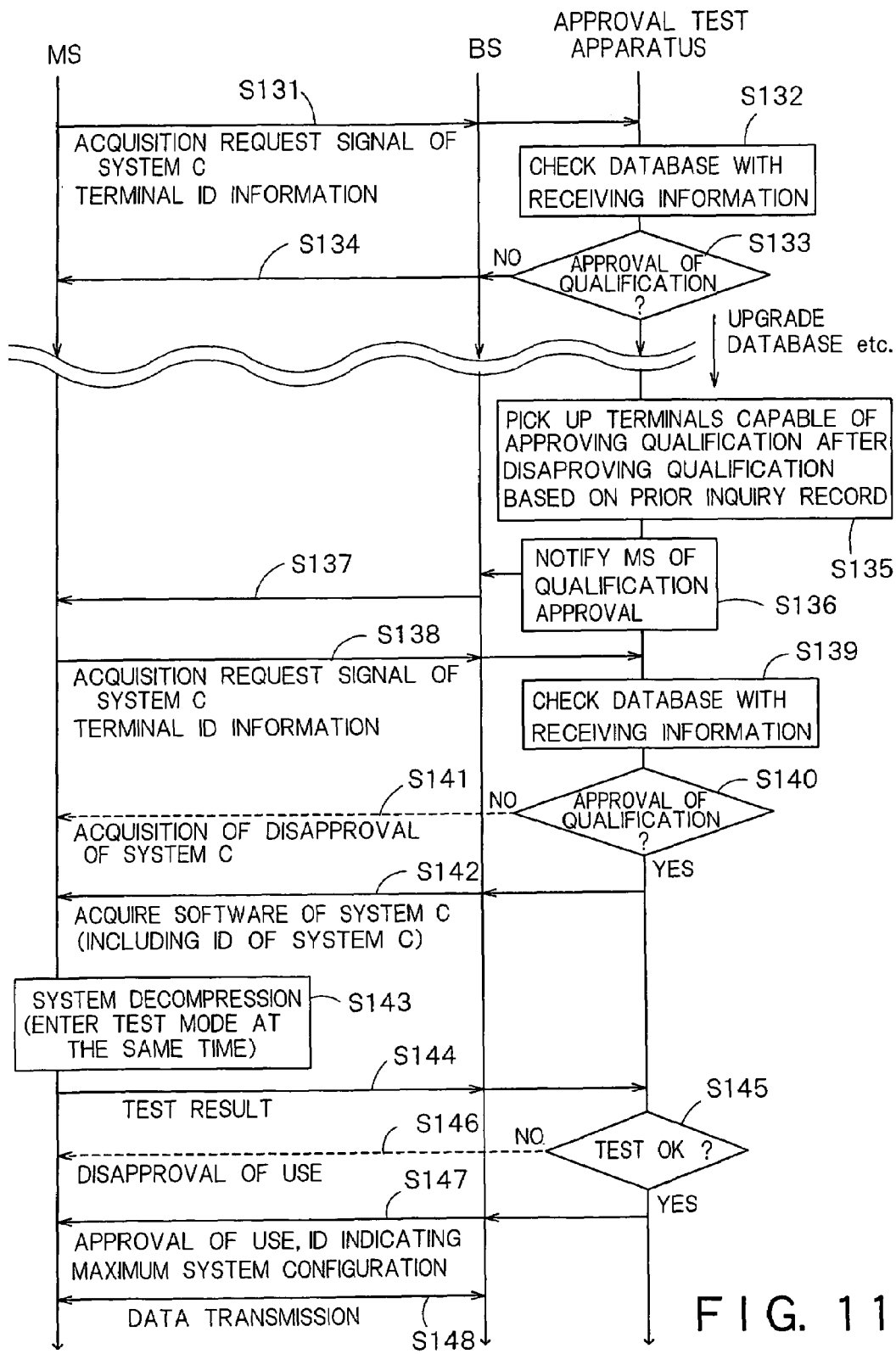
FIG. 11 is a flowchart showing a seventh processing procedure of the approval test system.

FIG. 11 is a flowchart showing the seventh processing procedure of the approval test system according to the present invention. Hereinafter, processings different from those of FIG. 4 will be mainly described. The approval test apparatus 1 picks up the wireless terminals capable of being approved by update of the database 12 among the wireless terminals MS which has already performed requirement of addition or deletion of the system (step S135), and notifies the approval to the wireless terminal MS (step S136).

The wireless terminal MS which desires acquisition of the software for the system C among the notified wireless terminals MS transmits the terminal ID information including an acquisition request signal to base station BS (step S138).

The approval test apparatus 1 checks the terminal ID information transmitted from the wireless terminal MS with information of the database 12 (step S139), and determines whether or not to give the type approve certificate (step S140). When giving the approval, the base station BS transmits the software for the system C to the wireless terminal MS (step S142), and the wireless terminal MS tests whether or not the system C is normally operated at the wireless terminal MS (steps S144–S148).

Thus, according to the seventh processing procedure, when it is possible to give the approval to the wireless terminal MS by update of the database 12 of the approval test apparatus 1, the approval is notified from the approval test apparatus 1 to the wireless terminal MS. Because of this, even if the wireless terminal MS does not inquire at the approval test apparatus 1, it is possible to acquire the approval, thereby saving the labor of user of the wireless terminal MS.

What is claimed is:

1. An approval test method for a software-defined radio terminal, comprising:

receiving a request signal from said software-defined radio terminal requesting an addition of a wireless function;

receiving identification information of said software-defined radio terminal;

determining upon the reception of the request signal whether or not to give a type approval certificate to the software-defined radio terminal based on a content of a database including approval information of a representative terminal whose configuration of hardware is same as said software-defined radio terminal; and transmitting a result of the determination from an approval test apparatus to said software-defined radio terminal, wherein said approval test apparatus transmits the result of the determination to said software-defined radio terminal which has outputted the request signal and the identification information; and said approval test apparatus transmits information necessary for giving the type approval certificate to said software-defined radio terminal to which the type approval certificate is not given.

2. The approval test method according to claim 1, further comprising:

loading a software for said additional wireless function at said software-defined radio terminal in case of receiving the approval;

examining whether or not the loaded software runs normally at said software-defined radio terminal;

determining whether or not the added wireless function works based on the examination result; and receiving identification information of the added wireless function at said software-defined radio terminal.

3. The approval test method according to claim 1, wherein said identification information of the radio terminal includes:

an inherent ID which identifies said software-defined radio terminal;

a system ID which identifies the wireless function included in said software-defined radio terminal; and a configuration ID which identifies kinds of currently available wireless functions at said software-defined radio terminal.

4. The approval test method according to claim 1, wherein said information used for getting the approval is at least one of acquisition of new software and a partial deletion of the wireless function already acquired by said software-defined radio terminal.

5. The approval test method according to claim 2, wherein the software for the wireless function to be added at said software-defined radio terminal is loaded from a wireless radio terminal storing said software.

6. The approval test method according to claim 2, wherein the software for the wireless function to be added at said software-defined radio terminal is loaded from a recording media storing said software.

7. The approval test method according to claim 1, further comprising:

giving the type approval certificate to said software-defined radio terminal in case that a preparation for giving the approval is completed at the software-defined radio terminal which has been disapproved before.

8. The approval test method according to claim 1, wherein said software-defined radio terminal adds or deletes the wireless function when the type approval certificate is given;

said software-defined radio terminal performs a processing necessary for the approval and transmits a result of the processing to said approval test apparatus; and said approval test apparatus determines whether or not to give the type approval certificate, based on the result of the processing transmitted from said software-defined terminal.

9. An approval test apparatus, comprising:

a database which stores approval information for a representative terminal whose configuration of hardware is same a software-defined radio terminal requesting a type approval certificate to the test apparatus;

an approval determination unit which determines whether the approval is given to said software-defined radio terminal based on said database, said software-defined radio terminal outputting both a request signal for adding a wireless function and identification information of said software-defined radio terminal, and outputs the determination result to said software-defined radio terminal; and an examination result determination unit which determines whether or not the added wireless function works at said software-defined radio terminal based on a examination result transmitted from said software-defined radio terminal examining whether or not a loaded software for the added wireless function runs normally, wherein said approval determination unit transmits the result of the determination to said software-defined radio terminal which has outputted the request signal and the identification information, and transmits information necessary for giving the type approval certificate to said software-defined radio terminal to which the type approval certificate is not given.

10. The approval test apparatus of claim 9, wherein said identification information of the radio terminal includes:

an inherent ID which identifies said software-defined radio terminal;

a system ID which identifies the wireless function included in said software-defined radio terminal; and a configuration ID which identifies kinds of currently available wireless functions at said software-defined radio terminal.

11. The approval test apparatus according to claim 9, wherein said information used for getting the approval is at least one of acquisition of new software and a partial deletion of the wireless function already acquired by said software-defined radio terminal.

12. The approval test apparatus according to claim 9, wherein said approval determination unit gives the type approval certificate to said software-defined radio terminal in case that a preparation for giving the approval is completed at the software-defined radio terminal which has been disapproved before.

* * * * *